United States Patent
Traylor et al.

(10) Patent No.: US 7,876,203 B2
(45) Date of Patent: Jan. 25, 2011

(54) COLLISION AVOIDANCE DISPLAY SYSTEM FOR VEHICLES

(75) Inventors: Steve Traylor, Blythewood, SC (US); Malcom B. McCormick, Blythewood, SC (US)

(73) Assignee: Lang Nekra North America, LLC, Ridgeway, SC (US)

( * ) Notice: Subject to any disclaimer, the term of this patent is extended or adjusted under 35 U.S.C. 154(b) by 285 days.

(21) Appl. No.: 11/700,222

(22) Filed: Jan. 30, 2007

(65) Prior Publication Data

US 2007/0182527 A1  Aug. 9, 2007

Related U.S. Application Data

(60) Provisional application No. 60/763,692, filed on Jan. 31, 2006.

(51) Int. Cl.
*B60Q 1/00* (2006.01)
(52) U.S. Cl. .................. 340/435; 340/436; 340/425.5
(58) Field of Classification Search .............. 340/435, 340/436
See application file for complete search history.

(56) References Cited

U.S. PATENT DOCUMENTS

| | | | |
|---|---|---|---|
| 4,766,421 A | 8/1988 | Beggs et al. | |
| 4,926,170 A | 5/1990 | Beggs et al. | |
| 5,122,796 A | 6/1992 | Beggs | |
| 5,311,012 A | 5/1994 | Juds et al. | |
| 5,354,983 A | 10/1994 | Juds et al. | |
| 5,418,359 A | 5/1995 | Juds et al. | |
| 5,463,384 A | 10/1995 | Juds | |
| 5,675,326 A | 10/1997 | Juds | |
| 5,734,336 A | 3/1998 | Smithline | |
| 6,128,576 A * | 10/2000 | Nishimoto et al. | 701/301 |
| 6,201,236 B1 | 3/2001 | Juds | |
| 6,363,326 B1 | 3/2002 | Scully | |
| 6,377,167 B1 | 4/2002 | Juds et al. | |
| 6,642,839 B1 | 11/2003 | Gunderson | |
| 6,727,808 B1 * | 4/2004 | Uselmann et al. | 340/436 |
| 6,894,608 B1 * | 5/2005 | Gunderson | 340/468 |
| 6,914,521 B2 | 7/2005 | Rothkop | |

(Continued)

FOREIGN PATENT DOCUMENTS

DE  10 2004 042107 A1  3/2006

(Continued)

*Primary Examiner*—George A Bugg
*Assistant Examiner*—Kerri McNally
(74) *Attorney, Agent, or Firm*—McNair Law Firm, P.A.; Seann P. Lahey

(57) ABSTRACT

The system includes a detector display having visual indicators arranged in a pattern representing a monitored area near the vehicle desired to be monitored. The visual indicators represent physical locations within the monitored area. An indicator controller is operatively associated with the detector display for actuating the visual indicators to display an object location in the pattern that corresponds to the location of an object in the monitored area. A proximity sensor is included in communication with the indicator controller for detecting the physical location of objects within the monitored area. A detection signal is transmitted by the proximity sensor to the indicator controller in response to detecting an object, wherein the indicator controller is operable to actuate the visual indicators in response to the detection signal to display an object location in the pattern that corresponds to an object location in the monitored area.

20 Claims, 12 Drawing Sheets

U.S. PATENT DOCUMENTS

| | | |
|---|---|---|
| 6,933,837 B2 | 8/2005 | Gunderson |
| 7,215,254 B2 * | 5/2007 | Tauchi ........................ 340/903 |
| 2001/0008992 A1 | 7/2001 | Saito et al. |
| 2003/0043058 A1 * | 3/2003 | Jamieson et al. ............ 340/961 |
| 2004/0090317 A1 * | 5/2004 | Rothkop ..................... 340/435 |
| 2005/0073433 A1 | 4/2005 | Gunderson et al. |
| 2005/0190082 A1 | 9/2005 | Kumata et al. |
| 2005/0190952 A1 | 9/2005 | Nagasawa et al. |

FOREIGN PATENT DOCUMENTS

| | | |
|---|---|---|
| EP | 07 10 1320 | 2/2007 |

* cited by examiner

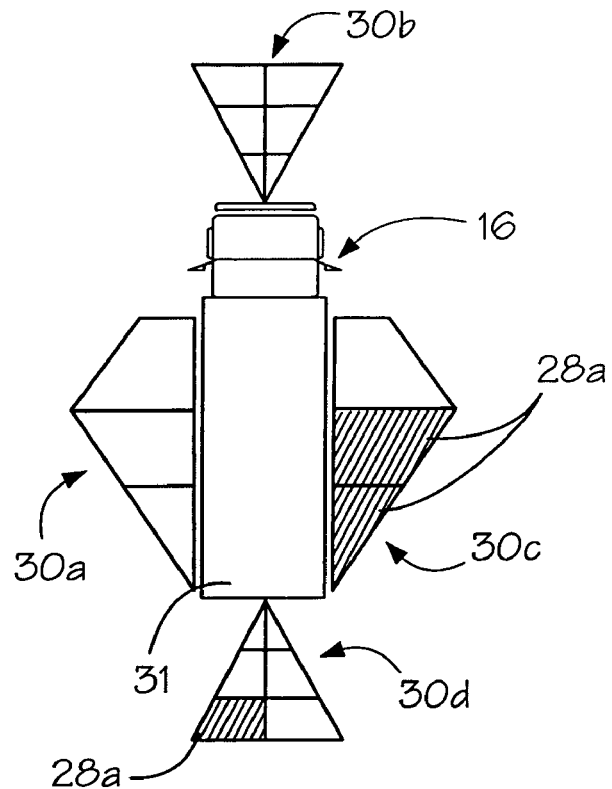
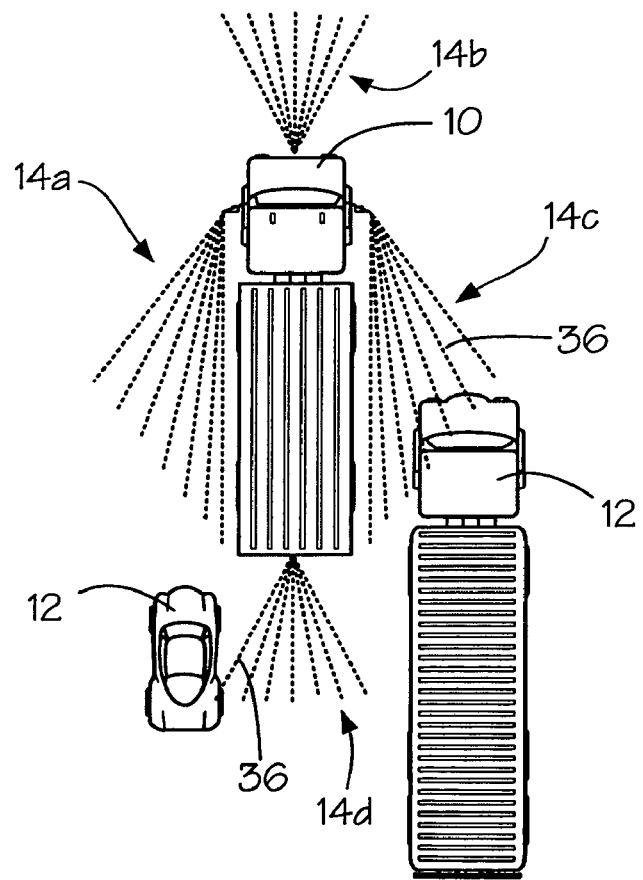
Fig. 8

COLLISION AVOIDANCE DISPLAY SYSTEM FOR VEHICLES

This application claims priority of U.S. Provisional Application Ser. No. 60/763,692, filed Jan. 31, 2006.

BACKGROUND OF THE INVENTION

1) Field of the Invention

The present invention relates to a display system for providing collision avoidance information to a driver of a vehicle, and more particularly, to a display for use in heavy vehicles representing a plurality of monitored areas around the vehicle which indicates the presence of one or more objects at a specific location within the monitored areas, as well as the relative movement of objects through the monitored areas, to provide the driver with an accurate representation of the location and movement of nearby objects relative to the heavy vehicle.

2) Description of Related Art

The prior art discloses various blind spot detection systems that warn the driver of a vehicle that another vehicle or obstacle is in close proximity. Blind spots are areas of limited driver vision around the vehicle and are typically defined by regions to the side and rear of the vehicle in which the driver is not able to clearly view approaching obstacles in the vehicle's mirrors. These blind spots are notably more present in heavy vehicles such as large trucks, tractor-trailers, emergency and specialty vehicles, recreation vehicles, and the like.

The blind spot indicators of the prior art largely consist of simple audio or visual alarms that only warn the driver that an object is in proximity to the vehicle. Some systems provide slightly more information, such as distance to the object. For example, U.S. Pat. No. 5,734,336 discloses a collision avoidance system that includes a mirror display having a plurality of light emitting diodes (LEDs) that indicate distance between the vehicle and an object in the vehicle's path. The LEDs are spaced apart in a linear arrangement and illuminated sequentially to indicate distance to the object. The LEDs may also be colored to indicate changes in distance.

Another example is U.S. Pat. No. 6,363,326 which discloses a method and apparatus for detecting an object on a side or back of a vehicle. The system includes a display unit including a power on LED, a second LED indicating an obstacle being detected, and a third LED indicating that no obstacle is being detected. The LEDs may also be colored yellow, green, and red to indicate the various sensing conditions.

These methods may be sufficient when the blind spot area to cover is small, or when no discrimination between objects is desired. However, for larger vehicles, or when greater detection ranges are required to cover larger areas, such as along the side of a tractor-trailer, it would be useful to discern between multiple objects and their relative position and movement to the large vehicle within a monitored area. Currently, the prior art does not teach providing an LED or like display which shows the position and relative movement of objects within a monitored area in relation to the vehicle, or which is capable of tracking and displaying information on multiple objects simultaneously.

Accordingly, it is an object of the present invention to provide a collision avoidance display system that detects the position of at least one object in a monitored area, such as a blind spot area.

It is a further object of the present invention to provide a collision avoidance display system that is also capable of visually displaying to the driver the location of objects within the monitored area adjacent the vehicle.

It is a further object of the present invention to provide a collision avoidance display system that is also capable of indicating to the driver the relative movement of objects within the monitored area adjacent the vehicle.

It is also a further object of the present invention to provide a collision avoidance display system including a detector display having visual indicators arranged into a pattern representing the physical configuration of the monitored area adjacent the vehicle so that an accurate representation to the driver of the vehicle can be made as to the location and movement of vehicles and other objects within the monitored area.

SUMMARY OF THE INVENTION

The above objectives are accomplished according to the present invention by providing a collision avoidance display system for a vehicle as detailed herein below. The system includes a detector display having visual indicators arranged in a pattern representing a monitored area near the vehicle desired to be monitored, and the visual indicators representing physical locations within the monitored area. An indicator controller is operatively associated with the detector display for actuating the visual indicators to display an object location in the pattern that corresponds to an object location in the monitored area. A proximity sensor is included in communication with the indicator controller for detecting the physical location of objects within the monitored area. A detection signal is transmitted by the proximity sensor to the indicator controller in response to detecting an object, wherein the indicator controller is operable to actuate the visual indicators in response to the detection signal to display an object location in the pattern that corresponds to an object location in the monitored area.

In a further embodiment, the proximity sensor defines a physical configuration for the monitored area, and the pattern of the visual indicators on said display corresponds to the physical configuration of the monitored area.

In another embodiment, the monitored area has a predefined physical configuration represented by the pattern of the visual indicators in the detector display, and the proximity sensor includes an object detection capacity correlated to the physical configuration of the monitored area to detect objects in the monitored area.

In a further advantageous embodiment, the pattern of the visual indicators on said display includes a plurality of monitoring zones with each of the monitoring zones representing the physical configuration of a corresponding monitored area adjacent the vehicle. The plurality of monitoring zones may include a left side monitoring zone and a right side monitoring zone representing the physical configuration of a left side monitored area and a right side monitored area on opposing sides of the vehicle, respectively. Further, the plurality of monitoring zones may also include a front monitoring zone and a back monitoring zone representing the physical configuration of a front monitored area and a back monitored area on opposing ends of the vehicle, respectively.

In a further embodiment, the system includes a left proximity sensor covering the left side monitored area with an array of object detection beams for detecting the physical location of objects within the left side monitored area, wherein each of the visual indicators in the left side monitoring zone is correlated with at least one of the object detection beams so that detection of an object by one of the object detection beams signals the indicator controller to actuate at least one corresponding visual indicator. Further, the system includes a right proximity sensor covering the right side monitored area with an array of object detection beams for detecting the physical location of objects within the right side monitored area, wherein each of the visual indicators in the right side monitoring zone is correlated with at least one of the object detection beams so that detection of an object by one of the object detection beams signals the indicator controller to actuate at least one corresponding visual indicator.

In a further embodiment, the system also includes a front proximity sensor covering the front monitored area with an array of object detection beams for detecting the physical location of objects within the front monitored area, wherein each of the visual indicators in the front monitoring zone is correlated with at least one of the object detection beams so that detection of an object by one of the object detection beams signals the indicator controller to actuate at least one corresponding visual indicator. Further, the system includes a back proximity sensor covering the back monitored area with an array of object detection beams for detecting the physical location of objects within the back monitored area, wherein each of the visual indicators in the back monitoring zone is correlated with at least one of the object detection beams so that detection of an object by one of the object detection beams signals the indicator controller to actuate at least one corresponding visual indicator, whereby the location of objects in the front and back monitored areas can be displayed in the front and back monitoring zones. As a result, the location of objects in the left side, right side, front and back monitored areas can be displayed in the left and right side monitoring zones.

In a further advantageous embodiment, the detector display includes a vehicle outline around which the plurality of monitoring zones are arranged for orienting the physical location represented by each of the monitoring zones in relation to the vehicle.

In one embodiment, the visual indicators in the plurality of monitoring zones are shaped in the form of round dots. In an alternative embodiment, the visual indicators in the plurality of monitoring zones are shaped in a form selected from one of triangular and rectangular block segments, and combinations thereof.

In a further embodiment, the proximity sensor includes a beam emitter for emitting light beams into the monitored area for detecting objects and the pattern of the visual indicators is correlated to represent the physical configuration of the monitored area covered by the beams. In a further embodiment, the visual indicators are operatively associated with at least one selected light beam so that detection of an object by one of the light beams signals the indicator controller to actuate at least one designated visual indicator corresponding to the light beam. The proximity sensor further includes a photodetector for detecting light from the light beams being reflected by objects in the monitored area and the photodetector generates the detection signal for transmission to the indicator controller.

In a further advantageous embodiment, a beam controller may be included which is operatively associated with the proximity sensor for actuating the beam emitter and photodetector to detect object location and relative movement of objects through the light beams in the monitored area. The beam controller is in communication with the indicator controller for receiving the detection signal from the photodetector and transmitting the detection signal to the indicator controller to actuate the visual indicators in response to the detection signal.

In a further advantageous embodiment, the indicator controller manipulates the lighting characteristics of the visual indicators to display the location of objects in the monitored area. In one embodiment, the lighting characteristics manipulated by the indicator controller includes the color of the light emitted by the indicators in response to detecting an object. In another embodiment, the lighting characteristics manipulated by the indicator controller includes the intensity of the light emitted by the indicators in response to detecting an object. In another embodiment, the lighting characteristics manipulated by the indicator controller includes the frequency of a blinking rate of the light emitted by the indicators in response to detecting an object. In another embodiment, the lighting characteristics manipulated by the indicator controller includes the number of indicators actuated in response to detecting an object. In another embodiment, the lighting characteristics manipulated by the indicator controller includes the pattern of the indicators actuated in response to detecting an object.

In a preferred embodiment, the visual indicators are light emitting diodes. In an alternative embodiment, the visual indicators may be liquid crystal displays.

In a further advantageous embodiment, the indicator controller actuates the visual indicators to display relative movement of objects in the monitored area in response to the detection signal from the proximity sensor.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
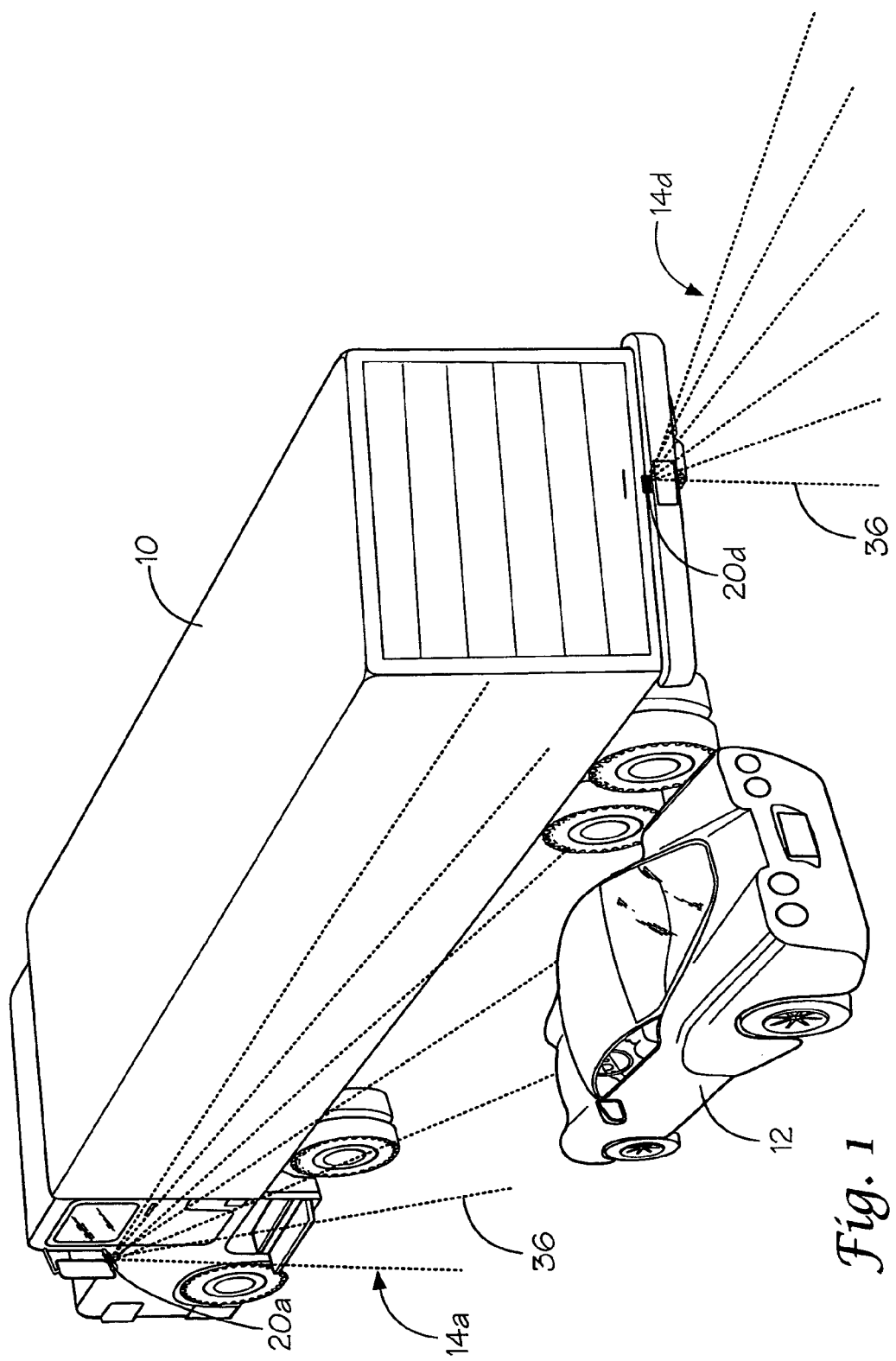
FIG. 1 shows a perspective view of a heavy vehicle equipped with the collision avoidance display system monitoring an approaching vehicle according to the present invention.

With reference to the drawings, the invention will now be described in more detail. Referring to FIG. 1, a heavy vehicle 10 is shown having a collision avoidance display system according to the present invention detecting the approach of an object 12, illustrated as a passenger vehicle, alongside heavy vehicle 10. As will be described in further detail herein, the system is constructed and arranged to display to the driver of heavy vehicle 10 the location of object 12 within a monitored area, indicated generally as 14a and 14d, adjacent heavy vehicle 10 in a manner that delivers external vehicle sensor data to the driver with minimal distraction to avoid a possible collision. The monitored areas are typically blind spot areas adjacent heavy vehicle 10 that the driver cannot easily see by looking in his mirrors. The present invention is designed to alert the driver to the presence of vehicles and other objects not readily seen with normal vehicle mirror systems or by line-of-sight. The system provides easily understood representations of monitored areas adjacent heavy vehicle 10 and the position of an object or objects within the monitored areas. However, the invention is not limited to monitoring only blind spot areas and can be used to display information to the driver about any area adjacent the vehicle as would be convenient to supplement the information received by the driver from normal vehicle mirror systems and other vehicle information systems.

Figure 2:
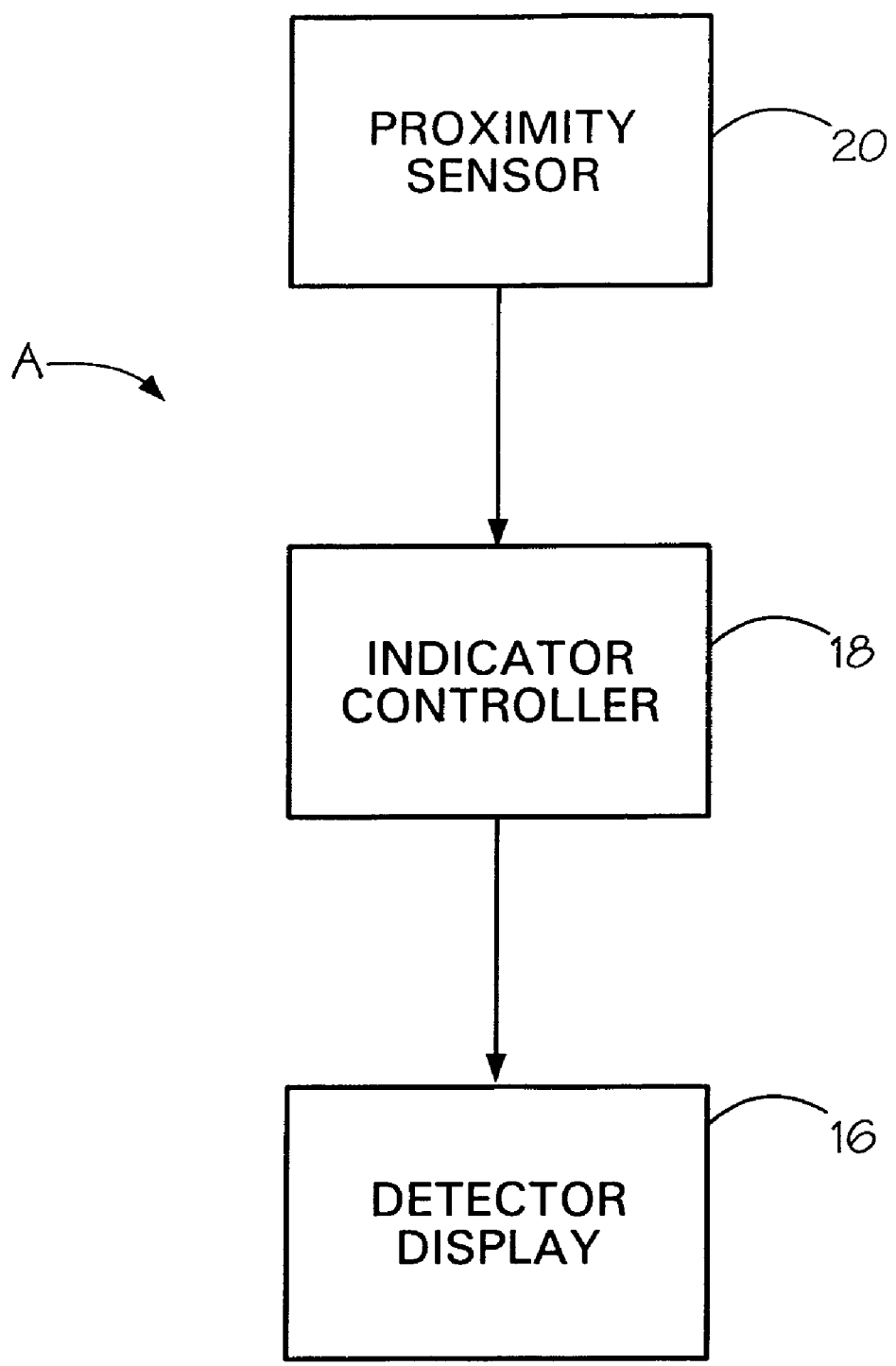
FIG. 2 shows a schematic diagram of a collision avoidance display system for a vehicle according to the present invention.

Referring to FIG. 2, a schematic representation is provided for the collision avoidance system, designated generally as A, in accordance with the present invention. In general, the system includes a detector display 16, an indicator controller 18, and at least one proximity sensor 20 in electronic communication with each other as described in detail herein below.

Figure 4:
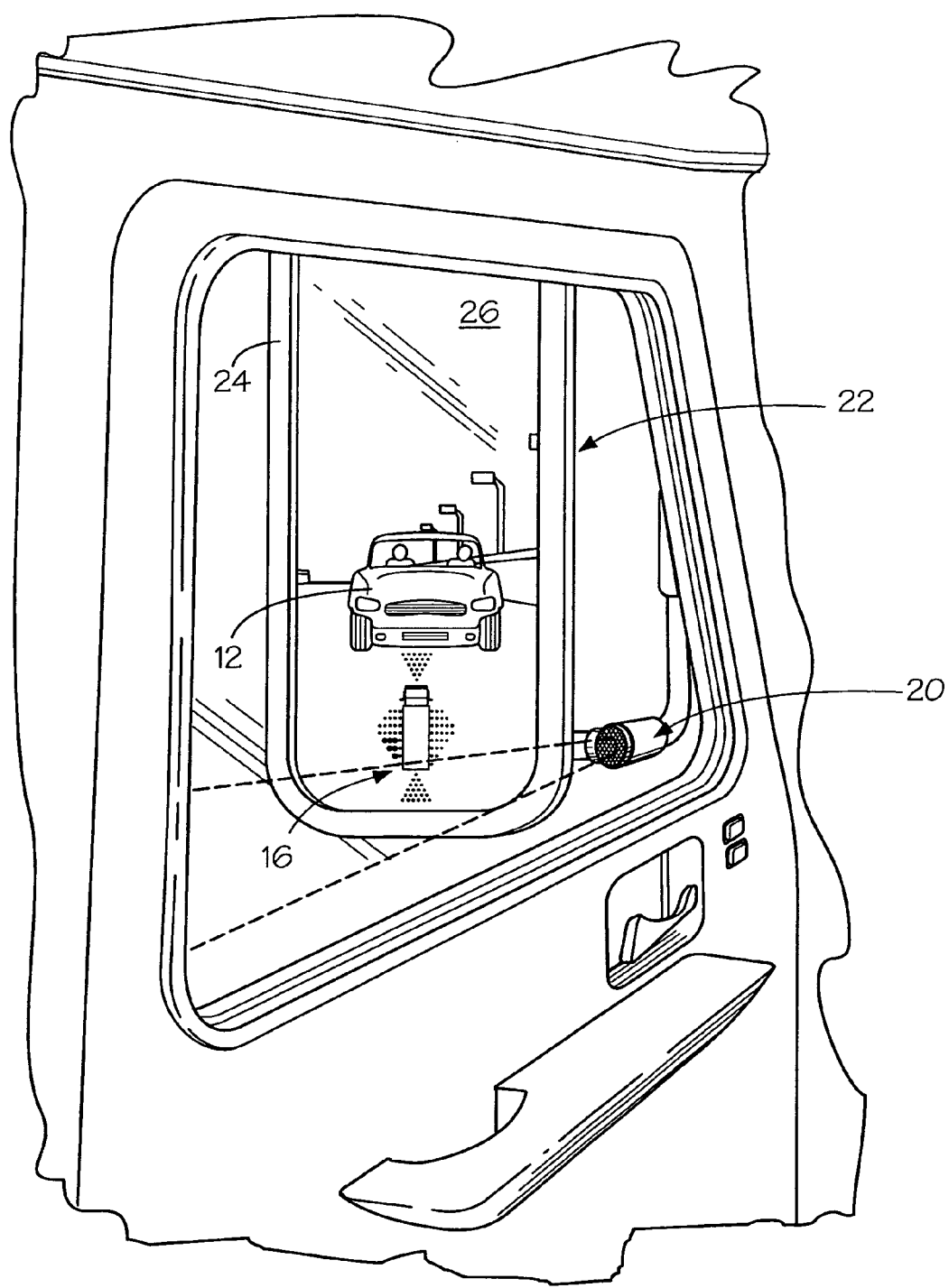
FIG. 4 shows a perspective view of a display carried in an exterior vehicle mirror viewable by the driver indicating the position and relative movement of the approaching vehicle depicted in FIG. 1 according to the present invention.

Referring to FIG. 4, the approach of object 12 alongside heavy vehicle 10 is shown from the perspective of the driver's side rearview mirror assembly, designated generally as 22. In a preferred embodiment, detector display 16 is located in exterior rearview mirror assembly 22 so the driver can monitor both the mirror and detector display 16 as object 12 approaches. As is well known to those skilled in the art, exterior rearview mirror assembly 22 includes a mirror housing 24 with a mirror pane 26 carried in housing 24 and a reflective coating disposed on a major surface of mirror pane 26. Detector display 16 is carried in mirror housing 24 behind mirror pane 26 to protect the various electronic components. The reflective coating is then adapted to pass at least a portion of the visible light projected from detector display 16 to be viewed by the driver. Adapting the reflective coating to pass a sufficient amount of light to be viewable by the vehicle driver can be accomplished by such well known methods as laser ablation and etching to thin or remove the reflective coating as necessary to pass the desired amount of light. While the preferred location of detector display 16 is in mirror assembly 22, detector display 16 may be located at any suitable location on the vehicle in view of the driver.

Further, detector display 16 may be active whenever the vehicle is in operation. Depending on the desired use, display 16 could alternatively be activated based on vehicle speed, or could be programmed to flash or perform some other lighting characteristic, as disused further below, when objects are in close proximity to the vehicle.

Figure 5A:
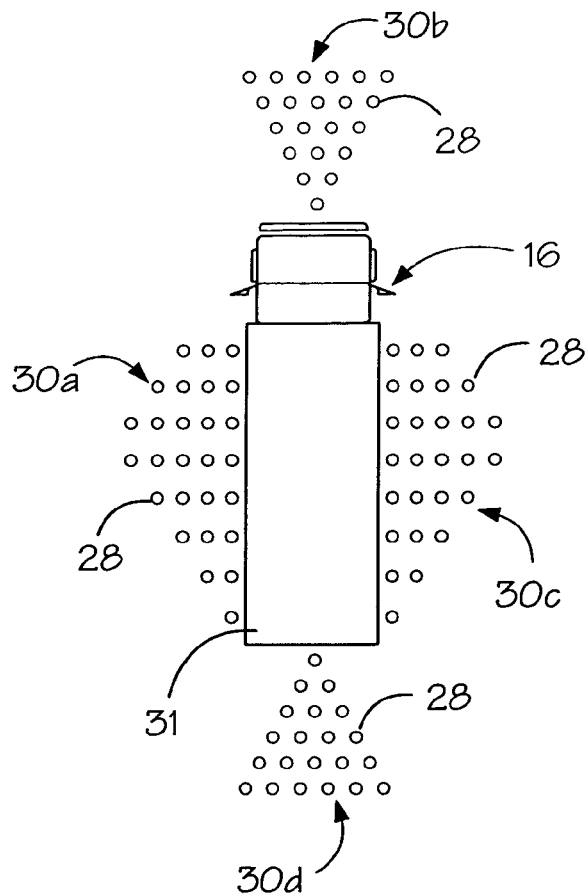
FIG. 5a shows a detailed view of the display according to the present invention.
Figure 5B:
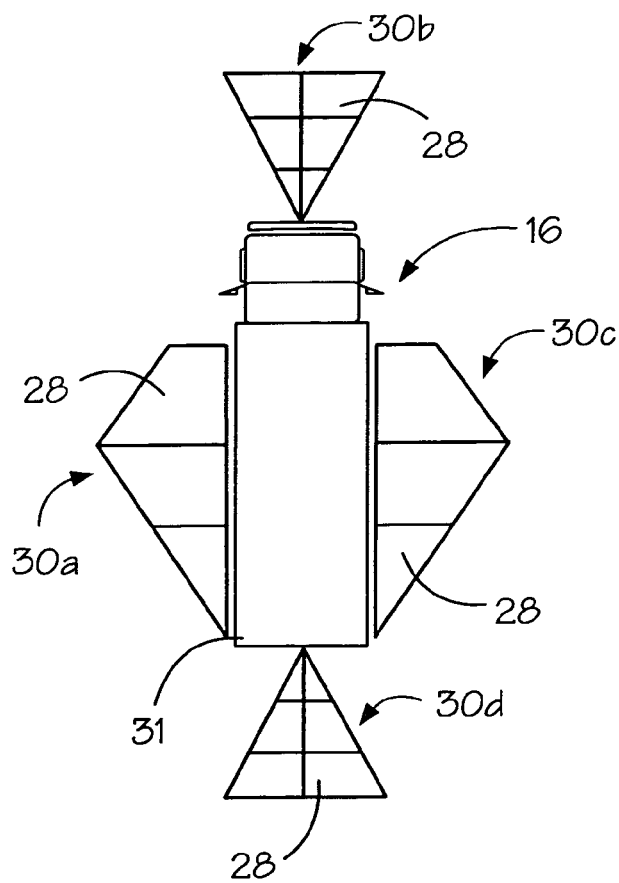
FIG. 5b shows an alternative embodiment of the display according to the present invention.
Figures 6A, 6B:
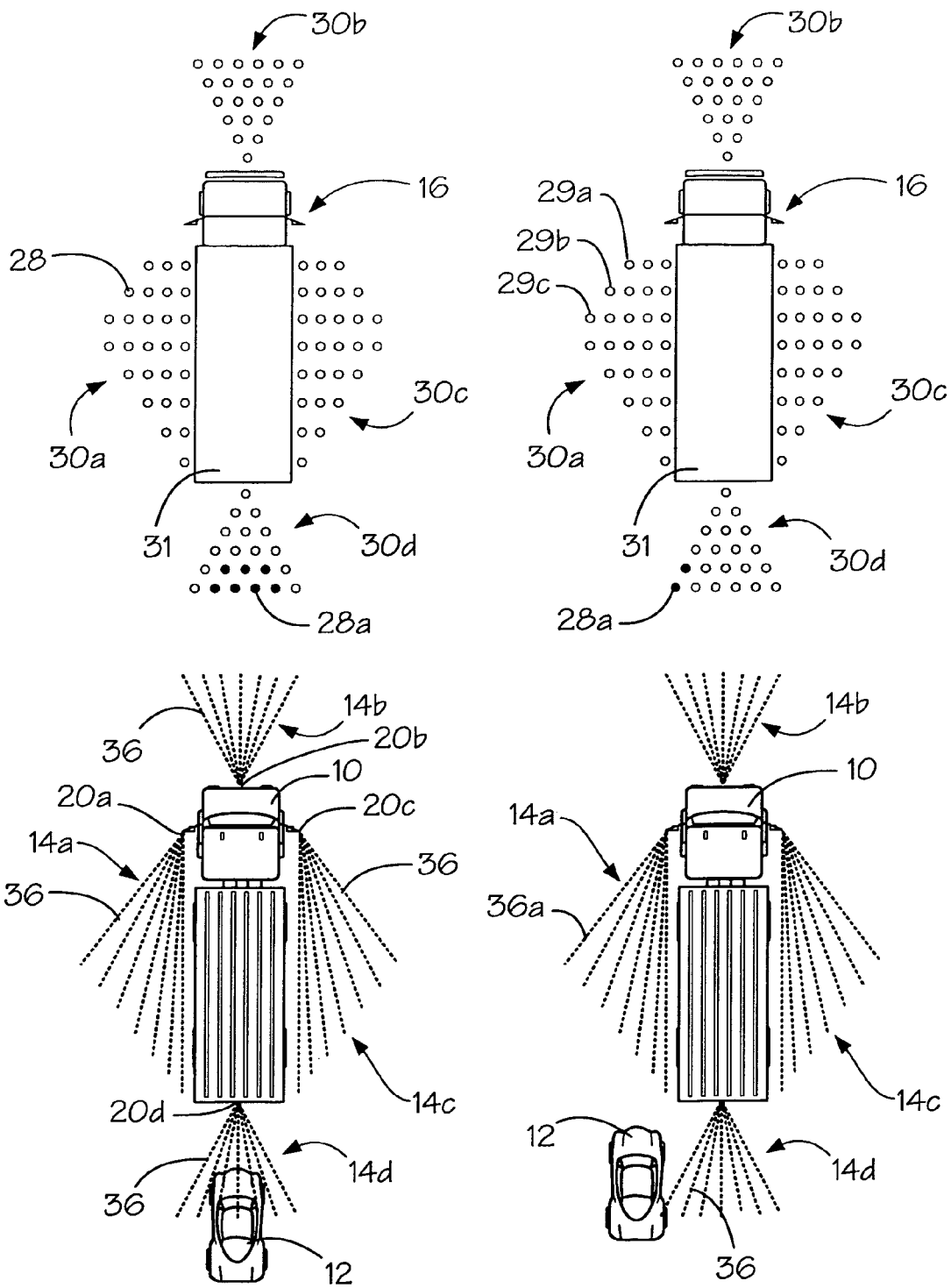
FIGS. 6a-6f show an overhead view of a heavy vehicle monitoring an approaching vehicle and the display indicating to the driver the position and relative movement of the approaching vehicle according to the present invention.

Referring to FIGS. 5a and 5b, two embodiments of detector display 16 are shown in which visual indicators 28 are arranged into a pattern of four monitoring zones 30a-30d that represent four different monitored areas adjacent the vehicle. The monitored areas are illustrated in FIG. 6a by reference numbers 14a-14d. Monitoring zones 30a and 30c represent monitored areas 14a and 14c on opposing sides of the vehicle, while monitoring zones 30b and 30d represent monitored areas 14b and 14d at the front and back of the vehicle. Each of visual indicators 28 represents a physical location within monitored areas 14a-14d. Indicator controller 18 is operatively associated with detector display 16 for actuating the visual indicators to display an object location in the pattern that corresponds to the location of the object in monitored areas 14a-14d.

Figures 7A, 7B:
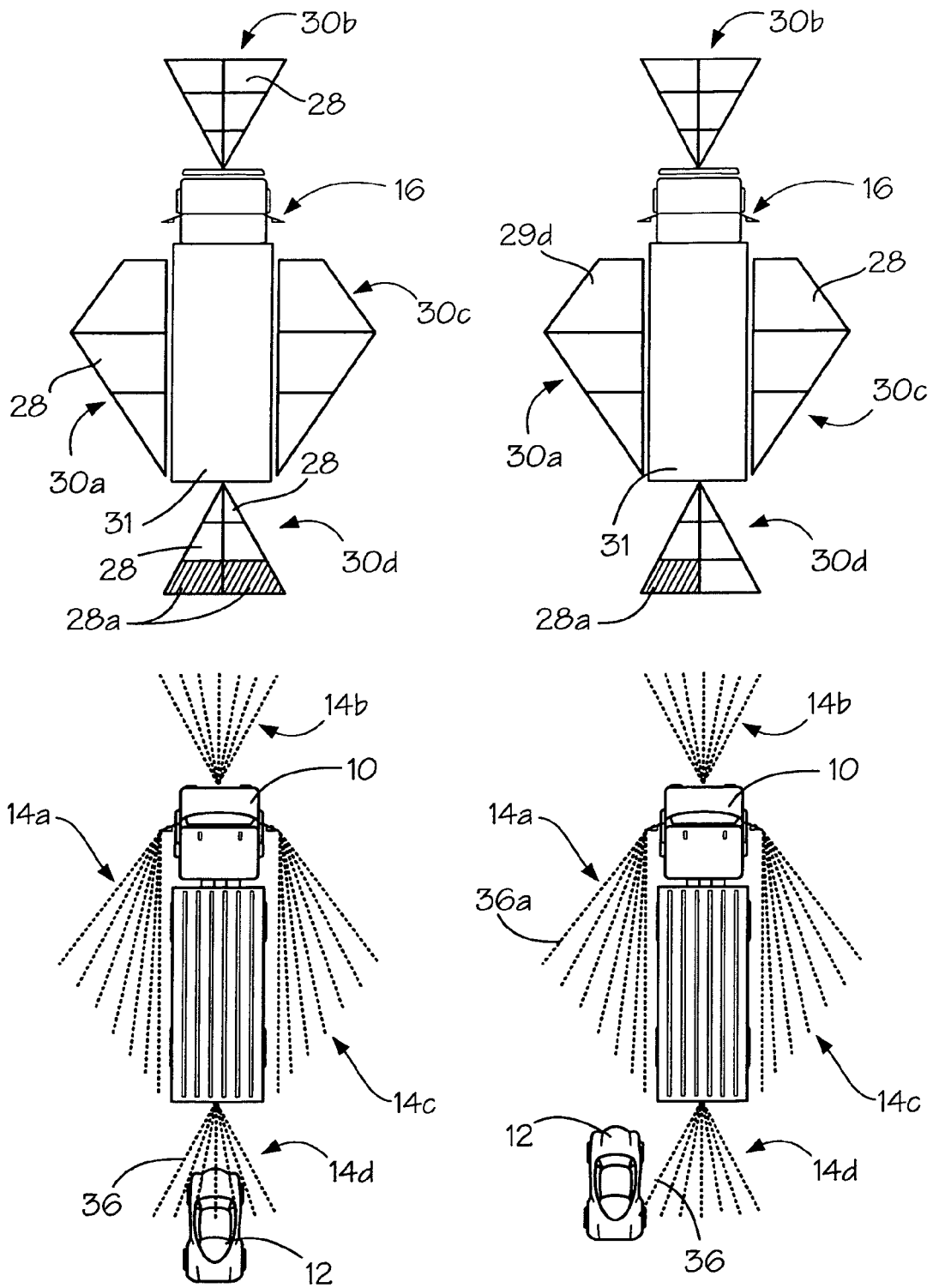
FIGS. 7a-7f show an overhead view of a heavy vehicle monitoring an approaching vehicle and an alternative embodiment of the display indicating to the driver the position and relative movement of the approaching vehicle according to the present invention; and, FIG. 8 shows an overhead view of a heavy vehicle monitoring a plurality of approaching vehicles and the alternative embodiment of the display indicating to the driver the position of the approaching vehicles according to the present invention.
Figure 7C:
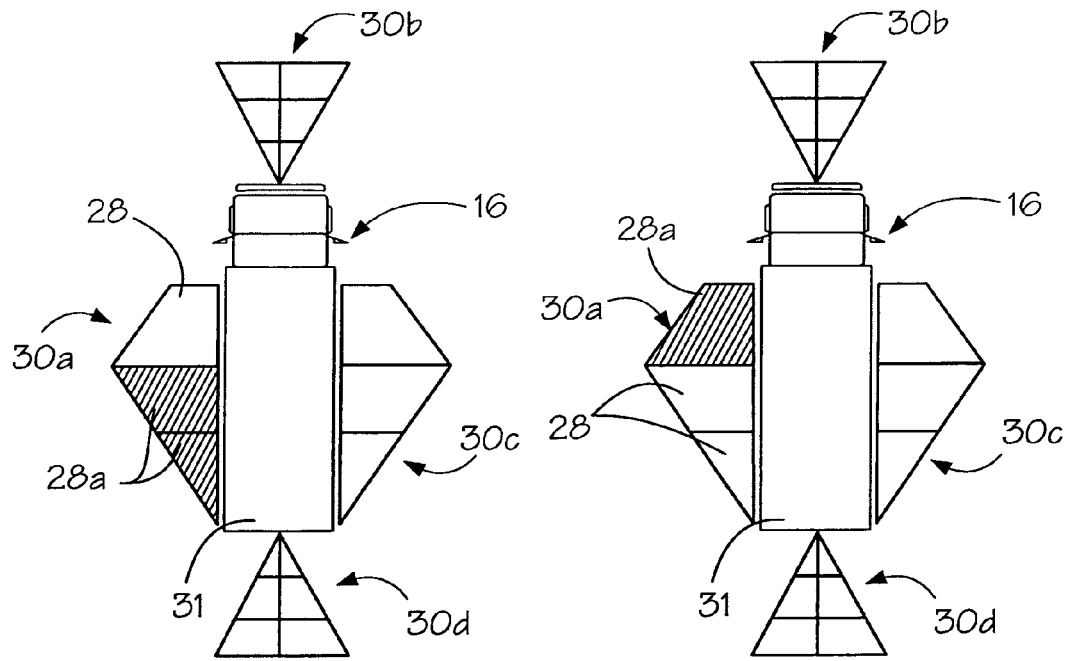
Figure 7D:
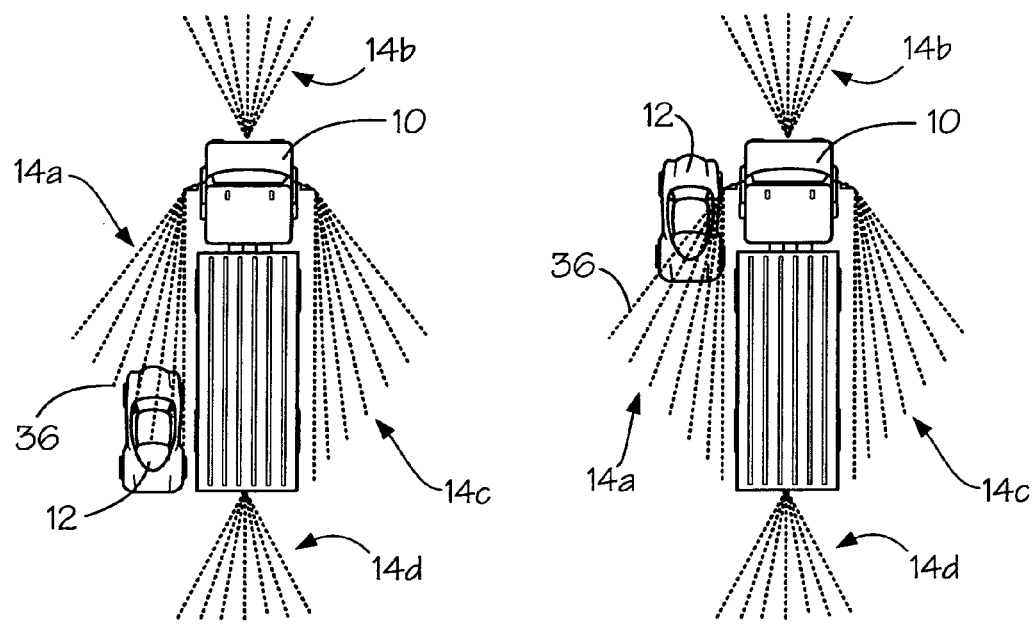
Figure 7E:
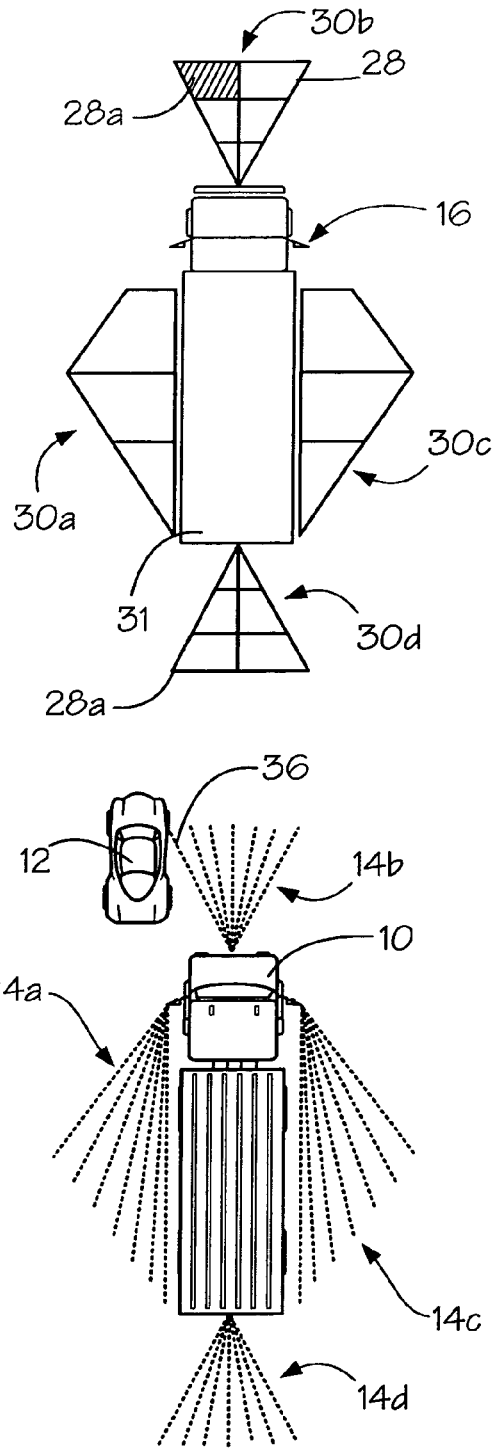
Figure 7F:
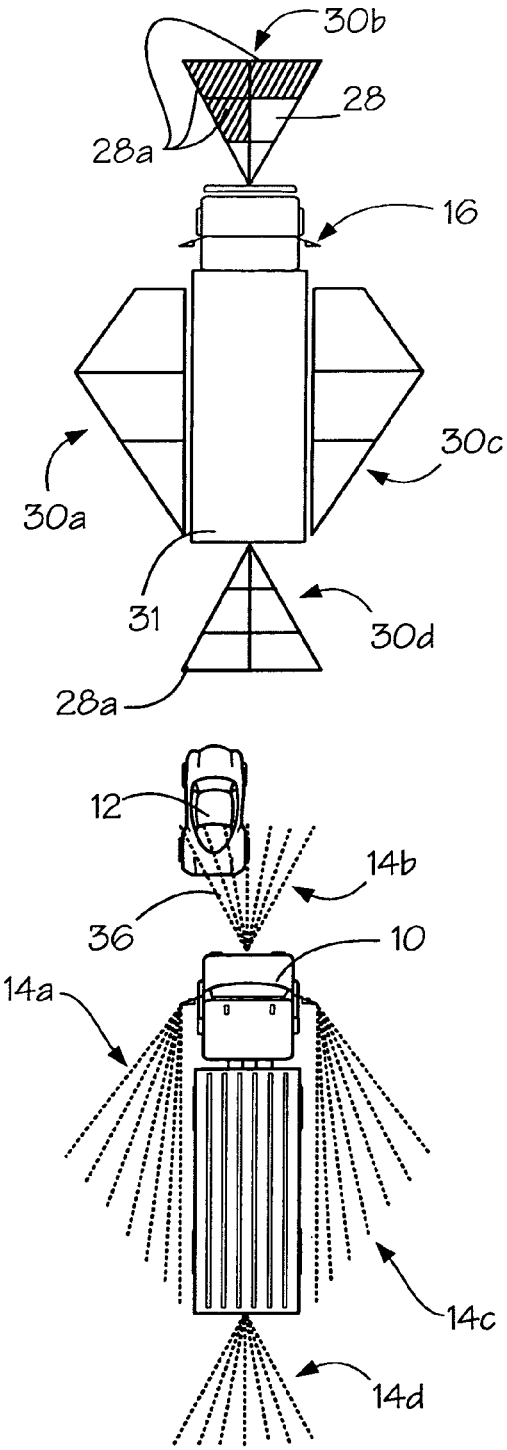

In the illustrated embodiment of FIGS. 6a and 7a, each of monitoring zones 30a-30d represent the physical configuration of a different monitored area 14a-14d adjacent vehicle 10. As noted above, each of visual indicators 28 in monitoring zones 30a-30d represent a specific physical location in each of monitored areas 14a-14d, which allows the driver to receive accurate information as to the actual location of objects in relation to the vehicle. In a further advantageous embodiment, detector display 16 may include a vehicle outline 31 around which monitoring zones 30a-30d are arranged for orienting the physical location represented by each of the monitoring zones in relation to the vehicle. As used herein, monitored area refers to the physical space being monitored adjacent the actual vehicle, and monitoring zone refers to the pattern of visual indicators 28 in detector display 16 that represents the physical configuration of the monitored area to display object location.

As shown in FIG. 5a, in one embodiment visual indicators 28 are individual illuminating dots arranged to form the general shape of the different monitoring zones 30a-30d that are covered by proximity sensors. This embodiment provides a maximum amount of information to the driver by breaking up the display into numerous individually actuated visual indicators. In this arrangement, detector display 16 is capable of showing the exact location and relative movement of multiple objects detected in the monitoring zones.

The alternative arrangement illustrated in FIG. 5b shows visual indicators 28 arranged into larger rectangular and triangular block segments that are individually actuated by indicator controller 18 to form monitoring zones 30a-d. While still capable of showing object location and relative movement, it is not as precise as the arrangement of FIG. 5a. However, the arrangement of FIG. 5b may be preferred by some drivers as the embodiment of FIG. 5a may provide too much information. The number and location of visual indicators 28 in the examples provided in FIGS. 5a and 5b are provided for illustrative purpose and can be varied based on the relative amount of information desired to be displayed. The arrangement of visual indicators 28 should be made to provide the best compromise between cost, location, and driver usage. The illustrated embodiments are considered exemplary for heavy vehicles with large blind spot areas.

The visual indicators 28 can use any suitable light emitting source commonly used for such automotive applications, for example, incandescent bulbs, light emitting diodes (LED), electro-luminescent (EL) panels or strips, neon or other gaseous bulbs, and/or liquid crystal displays (LCD). Preferably, the visual indicators are light emitting diodes.

Referring to FIG. 2, proximity sensor 20 is included in communication with indicator controller 18 for detecting the physical location of objects within a monitored area. A detection signal is transmitted by proximity sensor 20 to indicator controller 18 in response to detecting an object. Indicator controller 18 is operable to actuate visual indicators 28 in response to the detection signal to display in the pattern of visual indicators 28 the location of objects in the corresponding monitored area. In a further advantageous embodiment, indicator controller 18 actuates visual indicators 28 to also display relative movement of objects in the monitored areas in response to the detection signals from proximity sensors 20. Indicator controller 18 can be any suitable device that can receive detection signals from proximity sensor(s) 20 and transmit command signals to detector display 16 to actuate visual indicators 28 in a manner which displays object location and movement. Indicator controller 18 may be a separate component or could be integrated into either proximity sensor 20 or detector display 16 as appropriate.

Indicator controller 18 can be operable to manipulate the lighting characteristics of visual indicators 28 in a variety of different ways and combinations thereof. In one embodiment, the lighting characteristics manipulated by the indicator controller includes the color of the light emitted by the indicators. In another embodiment, the lighting characteristics manipulated by the indicator controller includes the intensity of the light emitted by the indicators. In another embodiment, the lighting characteristics manipulated by the indicator controller includes the frequency of a blinking rate of the light emitted by the indicators. In another embodiment, the lighting characteristics manipulated by the indicator controller includes the number of indicators actuated. In another embodiment, the lighting characteristics manipulated by the indicator controller includes the pattern of the indicators actuated. It should be understood that any one or combination of lighting characteristics could be used to alert the driver of approaching objects in the monitored area covered by proximity sensor 20. For example, upon detection of an object at a given location in the monitored area, the corresponding visual indicator(s) 28 may turn on, change color such as from green to red, increase the light intensity of corresponding visual indicators, cause the visual indicators to blink, change the frequency of a blinking rate, cause a different blinking pattern, etc. Also, different colors and blinking rates may be used together, for example. In the preferred embodiment, however, visual indicators 28 change color from green to red by indicator controller 18 when objects are detected by proximity sensor 20 to provide easily recognizable contrast within the pattern of visual indicators 28 in detector display 16. Alternatively, in another preferred embodiment visual indicators 28 are only illuminated as red dots or segments (FIGS. 5a and 5b) when an object is detected at the corresponding location in the monitored area associated with the illuminated visual indicators, leaving the rest of the visual indicators in a non-illuminated state.

Figure 3:
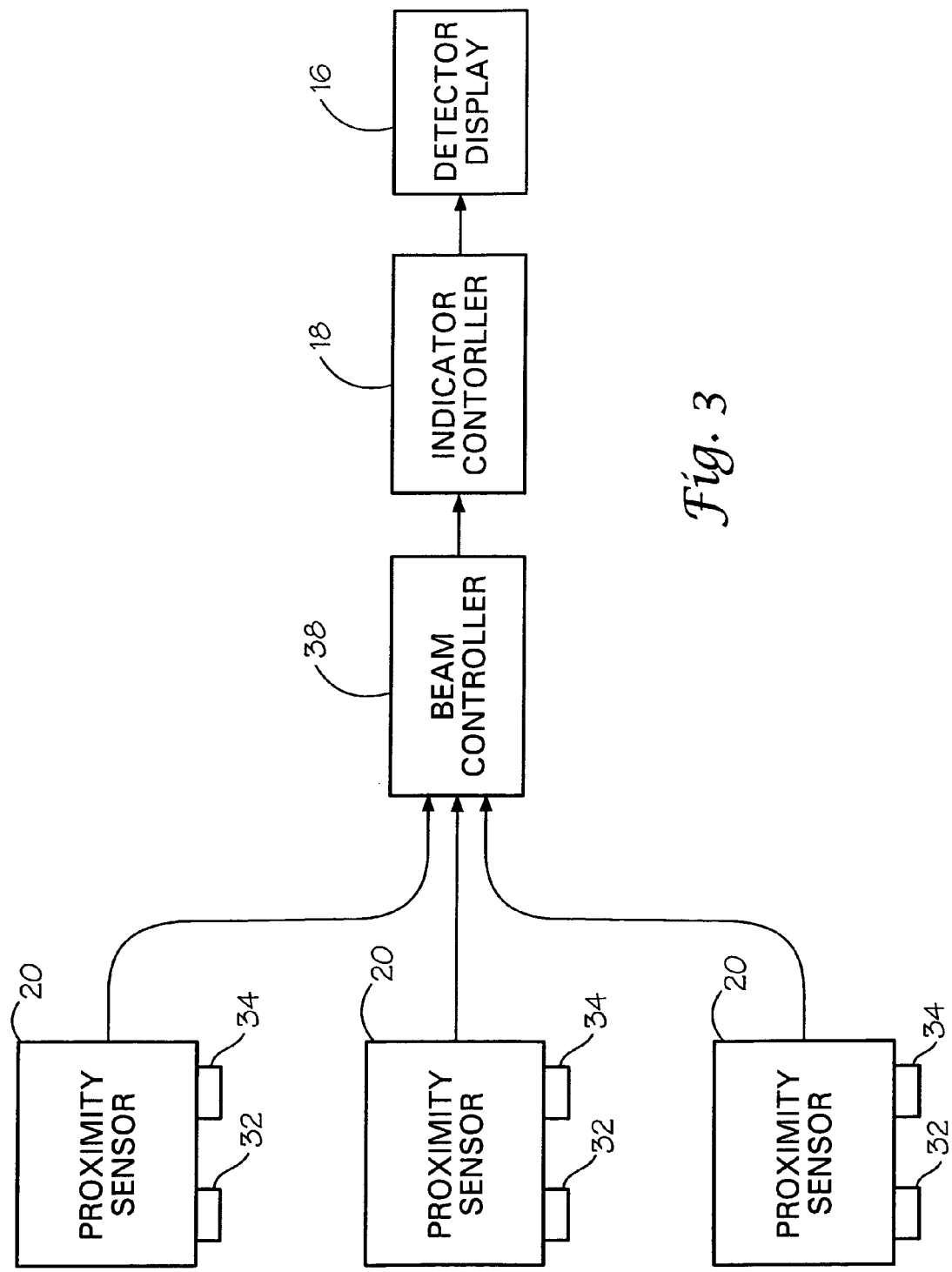
FIG. 3 shows a schematic diagram of an alternative embodiment of a collision avoidance display system for a vehicle according to the present invention.

Referring to FIG. 3, a schematic of a preferred embodiment of the invention is provided. In this embodiment, each of proximity sensors 20 include an object detection capacity that defines the physical dimensions of a monitored area, or alternatively, a proximity sensor is provided having an object detection capacity capable of covering a predefined physical configuration for a designated monitoring area adjacent the vehicle. As used herein, object detection capacity is the physical area of coverage provided by the proximity sensor in which the proximity sensor is capable of detecting objects. Further, the pattern of visual indicators 28 for each of monitoring zones 30a-30d (FIGS. 6a and 7a) is correlated to represent the physical configuration of the monitored area covered by the particular proximity sensor 20. For example, referring to FIG. 6a, a first proximity sensor 20a is provided with an object detection capacity, illustrated by light beams 36, that define the physical configuration of monitored area 14a. Visual indicators 28 in detector display 16 are then arranged into monitoring zone 30a to represent the physical configuration of the object detection capacity of first proximity sensor 20a. A second proximity sensor 20c is provided on an opposite side of vehicle 10 to provide monitored area 14c. Monitoring zone 30c is provided in detector display 16 to represent the physical configuration of monitored area 14c. A third proximity sensor 20b, defines monitored area 14b, which is then represented in detector display 16 by monitoring zone 30b. Finally, a fourth proximity sensor 20d, defines monitored area 14d, which is then represented in detector display 16 by monitoring zone 30d. Thus, detector display 16 is a representation of the different areas covered by the plurality of proximity sensors 20a-20d on vehicle 10.

In order to provide proximity sensors with a definable object detection capacity that can be correlated to visual indicators 28 of detector display 16, the preferred embodiment described herein uses proximity sensors that emit multiple infrared light beams 36 to detect moving and stationary objects in the area covered by the beams. The technology of proximity sensors using infrared beams is well described in U.S. Pat. Nos. 6,377,167; 6,201,236; 5,675,326; 5,463,384; 5,418,359; 5,311,012; 5,122,796; 4,926,170; and 4,766,421, which are hereby incorporated by reference in their entirety. In general, the hardware for this technology consists of a proximity sensor incorporating beam emitters 32 and photodetectors 34. Both sections use lenses and solid-state beam emitters and receptors mechanically situated to generate a desired beam pattern as illustrated in FIG. 6a by the monitored areas designed by reference numbers 14a-14d, which are defined by a plurality of light beams 36. Based on the arrangement of the lenses for beam emitters 32 and photodetectors 34, multiple infrared beams 36 may be transmitted or received in planar or non-planar formats. Radiation from emitters 32 is reflected by objects in the beams' path and returned to photodetectors 34.

An advantage of this technology is the use of beam signatures or encoding. Beams 36 are emitted in a coded fashion that allows the system photodetectors 34 to discriminate between arbitrary infrared radiation and the radiation of interest. Although emitters 32 could emit radiation in other than a beam, the beam configuration is detailed herein as providing the best option for correlating specific beams and locations within the object detection capacity of the proximity sensor to specific visual indicators 28 in detector display 16. Each of beams 36 is transmitted in a time-multiplexed fashion. Infrared radiation reflected by objects to photodetectors 34 is analyzed for the proper signature before being further processed. A further feature of this technology is measuring the time between transmitted beam and received beam in order to determine the distance of the object reflecting the transmitted, encoded radiation. This allows detector display 16 to show the specific location of the object in a monitored zone 30a-30d on the display. Further, by discriminating the time between transmitted and received radiation, the system can control the range of detection. Thus, the system can detect or ignore information reflected by objects within the object detection capacity created by beams 36, based on the range of the object from the system. As noted above, visual indicators 28 of detector display 16 may be designed to represent individual beams or the area covered by the beams. For example, referring to FIG. 6b, beam 36a in monitored area 14a can be correlated to visual indicators 29a-c in monitoring zone 30a of detector display 16. In this arrangement, beam 36a is represented generally by indicators 29a-c. Accordingly, when beam 36a detects an object, any of visual indicators 29a-c can be actuated to represent the location of the object within monitored zone 30a. Alternatively, referring to FIG. 7b, beam 36a can be correlated to visual indicator 29d. In this arrangement, the general area through which the beam travels is represented by visual indicator 29d.

A further advantage of this system is to allow detector display 16 to represent multiple objects and the relative movement of objects through beams 36, and to give the driver a precise representation of object location relative to heavy vehicle 10.

Referring to FIG. 3, in a further embodiment, a beam controller 38 may be included which is operatively associated with proximity sensors 20 for actuating beam emitters 32 and photodetectors 34 to detect object location and relative movement of objects through light beams 36 in the monitored area. The beam controller is in communication with indicator controller 18 for receiving the detection signal from photodetectors 34 and transmitting the detection signal to indicator controller 18 to actuate visual indicators 28 in response to the detection signal. Beam controller 38 may be any suitable device capable of controlling the operation of emitters 32 and processing the detection signals generated by photodetectors 34 from multiple proximity sensors, such as for example a serial data interface.

Figure 6C:
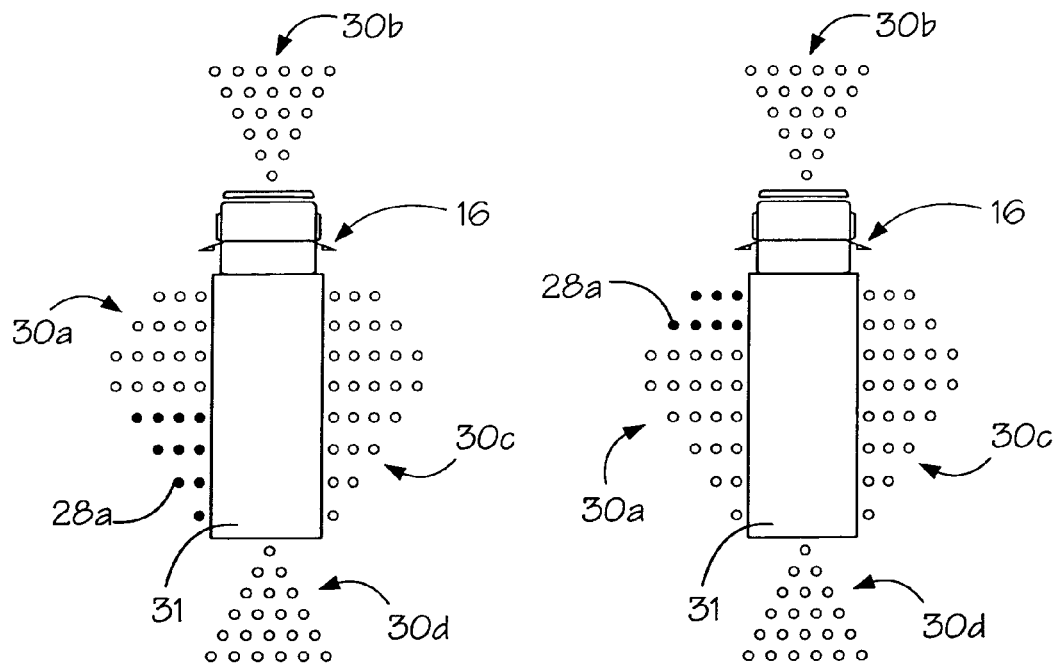
Figure 6D:
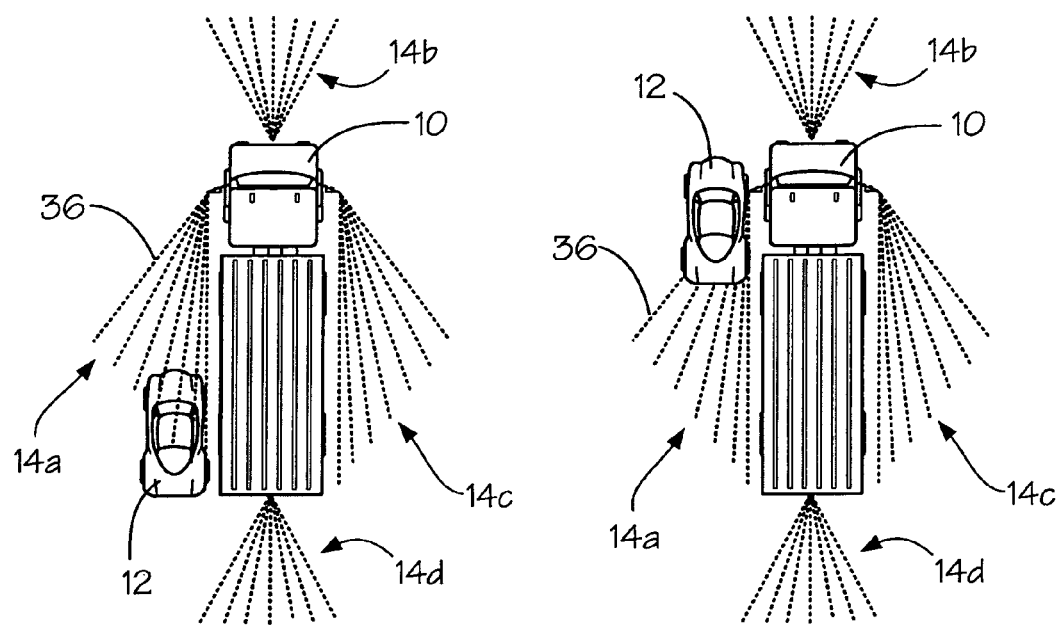
Figures 6E, 6F:
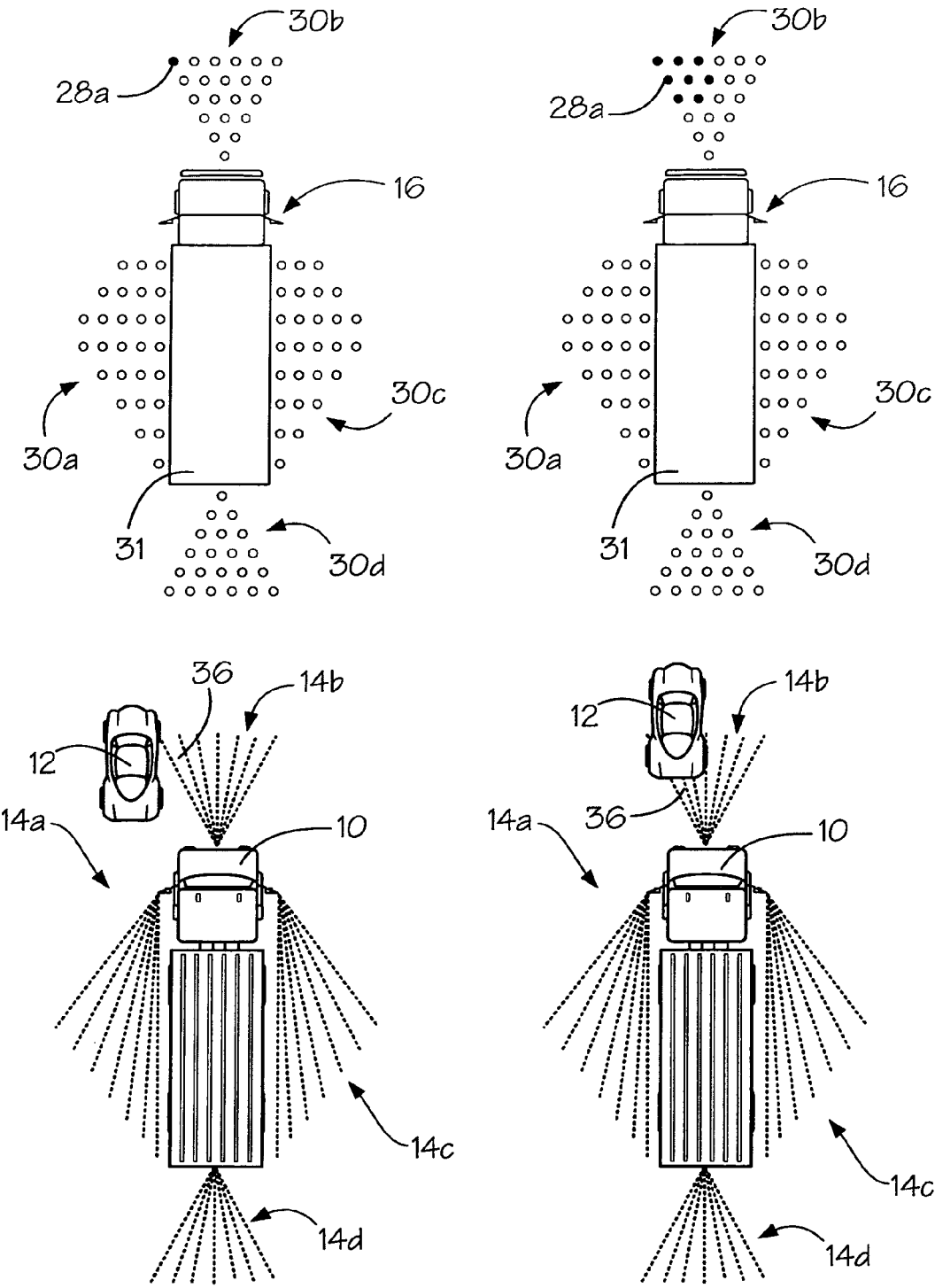

In accordance with the features described above in reference to FIGS. 2, 3 and further referring to FIG. 6a, proximity sensors 20 include beam emitters 32 for emitting light beams 36 into the monitored areas 14a-14d for detecting objects. The pattern of visual indicators 28 in detector display 16 is correlated to represent the physical configuration of monitored areas 14a-14d covered by beams 36. Each of visual indicators 28 is operatively associated with at least one selected light beam so that detection of an object by one of light beams 36 signals indicator controller 18 to actuate designated visual indicators 28 corresponding to the light beam which detected the object. As shown in FIG. 6a, object 12 approaches behind heavy vehicle 12 and enters monitored area 14d. Several of beams 36 detect object 12 and its position within monitored area 14d. A detection signal is communicated to indicator controller 18 which actuates detector display 16. Selected visual indicators, designated generally as 28a, correlated to the beams which detected object 12 are illuminated to alert the driver as to the detection and location of object 12 in relation to heavy vehicle 10. In FIG. 6b, object 12 has moved to the left and visual indicators 28 of detector display 16 are accordingly adjusted as detailed above. The illuminated visual indicators are identified generally as 28a. As shown in FIG. 6c, object 12 has now moved along the side of heavy vehicle 10 into monitored area 14a. Beams 36 detect object 12 and indicator controller 18 is signaled to actuate visual indicators 28a in monitoring zone 30a of detector display 16 to display the relative location of object 12 to heavy vehicle 10. In FIG. 6d, object 12 has moved forward through monitored area 14a and appropriate visual indicators are illuminated to show the change in position. In FIGS. 6e and 6f, object 12 is shown moving into different locations within monitored area 14b, and the appropriate visual indicators 28a being actuated in response to detection signals.

FIGS. 7a-7f illustrate the same concept as detailed above but with the alternative embodiment of detector display 16 described above in FIG. 5b. In this arrangement, instead of individual dots associated with specific light beams emitted from proximity sensor 20, visual indicators 28 that form monitoring zones 30a-30d are arranged into larger segments with each segment 28 correlated to specific areas covered by light beams 36 and illuminated based on the location of the object within the monitored areas 14a-14b. The illuminated visual indicators are designated by reference number 28a. FIG. 8 illustrates the detection of multiple objects in different monitored areas 14c and 14d with corresponding visual indicator segments 28a illuminated in monitoring zones 30c and 30d.

While the above embodiment focuses on the use of infrared light beam technology, it should be made clear that the type of detector display described herein could be used with any type of sensor capable of providing range and location information to indicator controller 18, such as sensors using microwaves, ultrasound waves, radio waves, electromagnetic waves, laser beams, and the like.

While a preferred embodiment of the invention has been described using specific terms, such description is for illustrative purposes only, and it is to be understood that changes and variations may be made without departing from the spirit or scope of the following claims.

What is claimed is:

1. A collision avoidance display system for a vehicle comprising:

a detector display having a plurality of visual indicators arranged in a pattern on said display representing a defined monitored area along a first side of the vehicle, wherein each of said visual indicators on said display represents a distinct physical location within said monitored area;

an indicator controller operatively associated with said detector display for actuating said visual indicators to display an object location in said pattern that corresponds to a physical location of an object within said monitored area;

a proximity sensor having a total physical area of sensor coverage defining the physical limit of said proximity sensor to detect an object, wherein said total physical area of sensor coverage defines said monitored area and said proximity sensor is in communication with said indicator controller for detecting said physical location of said object within said monitored area, wherein said pattern of said visual indicators in said display is arranged to render to a driver said total physical area of sensor coverage defining said monitored area in specific relation to said first side of the vehicle so that said display shows the physical limit of said proximity sensor to detect an object next to the vehicle;

a detection signal being transmitted by said proximity sensor to said indicator controller in response to detecting said object, wherein said indicator controller is operable to actuate said visual indicators in response to said detection signal to display said object location in said pattern that corresponds to said physical location of said object in said monitored area;

a beam emitter included in said proximity sensor for emitting light beams into said monitored area for detecting said object, and wherein said pattern of said visual indicators is correlated to represent the physical configuration of the monitored area covered by said beams;

a photodetector included in said proximity sensor for detecting light from said light beams being reflected by said object in said monitored area, and wherein said photodetector generates said detection signal for transmission to said indicator controller;

a beam controller operatively associated with said proximity sensor for actuating said beam emitter and said photodetector to detect said object location and relative movement of said object through said light beams in said monitored area, and wherein said beam controller is in communication with said indicator controller for receiving said detection signal from said photodetector and transmitting said detection signal to said indicator controller to actuate said visual indicators in response to said detection signal.

2. The display system of claim 1 wherein said pattern of said visual indicators on said display includes a plurality of monitoring zones each corresponding in physical configuration to one said monitored area adjacent the vehicle.

3. The display system of claim 2 wherein said plurality of monitoring zones on said display include a left side monitoring zone and a right side monitoring zone wherein a plurality of said visual indicators are arranged in each said monitoring zone representing the physical configuration of a left side monitored area and a right side monitored area on opposing sides of the vehicle, respectively.

4. The display system of claim 3 including a left proximity sensor covering said left side monitored area with an array of object detection beams for detecting the physical location of said object within said left side monitored area, wherein each of said visual indicators in said left side monitoring zone is correlated with at least one of said object detection beams so that detection of said object by one of said object detection beams signals said indicator controller to actuate a correlated one of said visual indicators; and, a right proximity sensor covering said right side monitored area with an array of object detection beams for detecting the physical location of said object within said right side monitored area, wherein each of said visual indicators in said right side monitoring zone is correlated with at least one of said object detection beams so that detection of said object by one of said object detection beams signals said indicator controller to actuate a correlated one of said visual indicators, whereby the location of said object in said left side and right side monitored areas can be displayed in said left and right side monitoring zones.

5. The display system of claim 4 wherein said plurality of monitoring zones on said display include a front monitoring zone and a back monitoring zone wherein a plurality of said visual indicators are arranged in each said monitoring zone representing the physical configuration of a front monitored area and a back monitored area on opposing ends of the vehicle, respectively.

6. The display system of claim 5 including a front proximity sensor covering said front monitored area with an array of object detection beams for detecting the physical location of said object within said front monitored area, wherein each of said visual indicators in said front monitoring zone is correlated with at least one of said object detection beams so that detection of said object by one of said object detection beams signals said indicator controller to actuate a correlated one of said visual indicators; and, a back proximity sensor covering said back monitored area with an array of object detection beams for detecting the physical location of said object within said back monitored area, wherein each of said visual indicators in said back monitoring zone is correlated with at least one of said object detection beams so that detection of said object by one of said object detection beams signals said indicator controller to actuate a correlated one of said visual indicators, whereby the location of said object in said front and back monitored areas can be displayed in said front and back monitoring zones.

7. The display system of claim 2 wherein said plurality of monitoring zones on said display include a front monitoring zone and a back monitoring zone representing the physical configuration of a front monitored area and a back monitored area, respectively.

8. The display system of claim 2 wherein said detector display includes a vehicle outline around which said plurality of monitoring zones are arranged for orienting the physical location represented by each of said monitoring zones in relation to the vehicle.

9. The display system of claim 2 wherein said visual indicators in said plurality of monitoring zones are shaped in the form of round dots.

10. The display system of claim 2 wherein said visual indicators in said plurality of monitoring zones are shaped in a form selected from one of triangular and rectangular block segments, and combinations thereof.

11. The display system of claim 1 wherein said visual indicators are operatively associated with at least one selected light beam so that detection of said object by one of said light beams signals said indicator controller to actuate at least one designated visual indicator corresponding to said light beam.

12. The display system of claim 1 wherein said indicator controller manipulates lighting characteristics of said visual indicators to display in said pattern said object location detected in said monitored area.

13. The display system of claim 12 wherein said lighting characteristics manipulated by said indicator controller includes a color of a light emitted by said indicators in response to detecting said object in said monitored area.

14. The display system of claim 12 wherein said lighting characteristics manipulated by said indicator controller includes an intensity of a light emitted by said indicators in response to detecting said object in said monitored area.

15. The display system of claim 12 wherein said lighting characteristics manipulated by said indicator controller includes a frequency of a blinking rate of a light emitted by said indicators in response to detecting said object in said monitored area.

16. The display system of claim 12 wherein said lighting characteristics manipulated by said indicator controller includes actuating at least one of said visual indicators in response to detecting said object in said monitored area.

17. The display system of claim 12 wherein said lighting characteristics manipulated by said indicator controller includes said pattern of said indicators actuated in response to detecting said object in said monitored area.

18. The display system of claim 1 wherein said visual indicators are light emitting diodes.

19. The display system of claim 1 wherein said visual indicators are liquid crystal displays.

20. The display system of claim 1 wherein said indicator controller actuates said visual indicators to display relative movement of at least one said object in said monitored area in response to said detection signal from said proximity sensor.

* * * * *